W. H. SILLS.
APPARATUS FOR MAKING MICA BOARD.
APPLICATION FILED APR. 1, 1912.
1,133,325.
Patented Mar. 30, 1915.
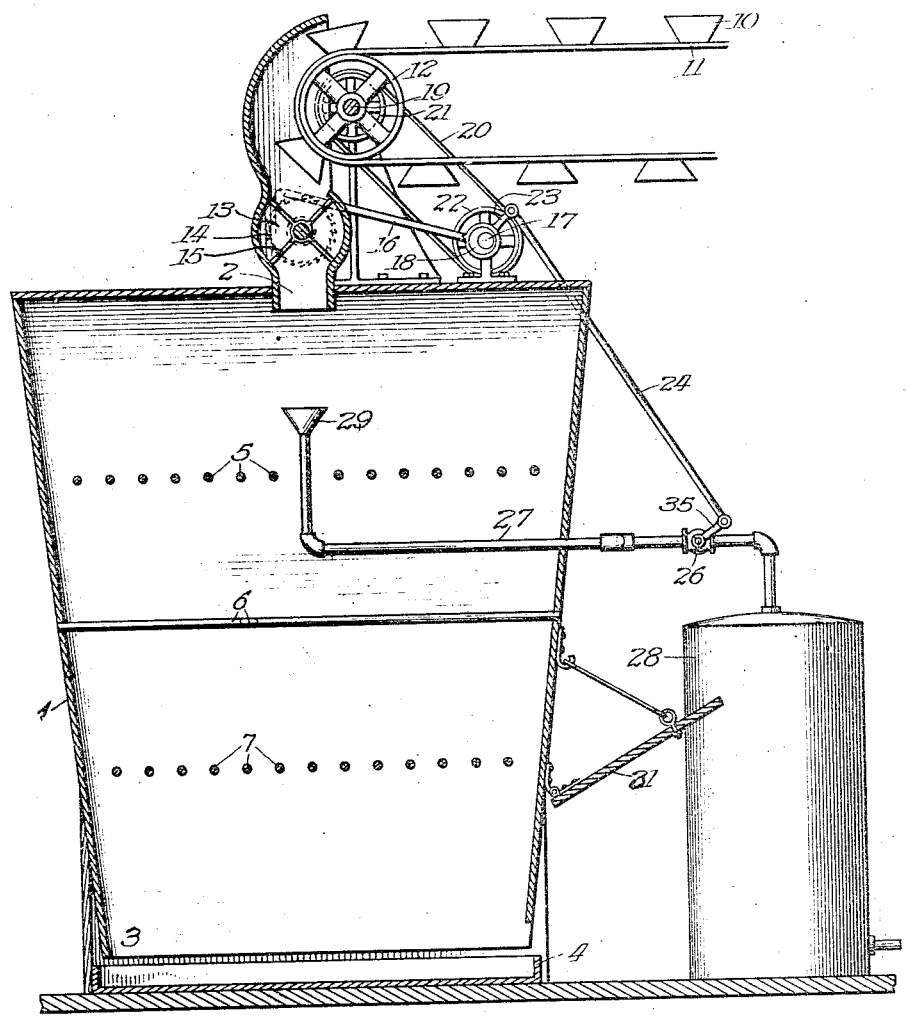
Witnesses:
Robert H. Weir
Arthur Carlson
Inventor:
William H. Sills
by felix Stern
Atty.

UNITED STATES PATENT OFFICE.

WILLIAM H. SILLS, OF CHICAGO, ILLINOIS.

APPARATUS FOR MAKING MICA-BOARD.

1,133,325.

Specification of Letters Patent.

Patented Mar. 30, 1915.

Application filed April 1, 1912. Serial No. 687,912.

*To all whom it may concern:*

Be it known that I, WILLIAM HENRY SILLS, a citizen of the United States, residing at Chicago, in the county of Cook and State of Illinois, United States of America, have invented new and useful Improvements in Apparatus for Making Mica-Board, of which the following is a specification.

This invention relates to an apparatus for making mica board.

An object of the invention is to provide a device by means of which loose films of mica of irregular shape may be assembled so as to form a cake or plate of mica and may be held together by means of shellac or some other adhesive substance.

Another object of the invention is to provide a device for transferring loose films of mica by gravity from an elevated point to a support on which they are built up to form a cake and to loosen up the packs of films on their path to said support.

Another object of the invention is to effect the loosening or breaking up of the mica films by means of a blast of air or some other gas, which blast is directed substantially in opposite direction to that which the films follow in their conveyance to the support.

Another object of the invention is to provide a device for uniting loose films of mica on a support by means of shellac or another adhesive in solid form.

Another object of the invention is to provide an apparatus for building mica plates from films by means of obstructions which are placed in the path of the loosened mica films to the support.

With these and other objects in view I have illustrated in the accompanying drawing a diagrammatic section, partly in elevation, of an apparatus which may serve for performing the invention mentioned above.

According to this method films of mica are continuously or intermittently carried to the receiving end of a barrel or tower 1; the upper end 2 of which is open so that the films of mica may readily enter the tower. The films are carried by gravity to the bottom 3 of the tower; at the bottom thereof a plate 4 is removably disposed and serves as a base for the cake or plate of mica to be formed. In order to break up the conglomerations or packs of films which enter the upper end of the tower and for the purpose of dispersing said films so that they land on the base 4 at the lower end in the form of a layer of approximately uniform thickness, means are provided for intermittently or continuously directing a gust or puff of wind against the films in their passage through the tower.

Dispersion of the films is supported by a plurality of obstructions in the path of the films. In the embodiment illustrated diagrammatically in the drawing a plurality of rods 5, 6, 7, are shown disposed in several series at different distances from the upper end of the tower. The rods in each series extend transversely through the tower and in a direction different from the rods in the series above or below.

In the embodiment of the invention which is illustrated the films are conveyed to the tower by means of buckets 10 which are disposed on a carrying belt 11, said belt being guided about the pulley 12 and being driven by some suitable means which are not shown in the drawing. When the buckets reach successively the inverted position the contents thereof will drop out and are conveyed by their own weight to a regulating and measuring device 13 which is shown at the top end of the tower. This regulating or collecting device comprises a wheel 14 having a plurality of arms 15 and which is intermittently rotated by means of a rod 16 connected to the shaft 17 by an eccentric 18. This shaft 17 is driven from the shaft 19 of the pulley 12 by a belt 20 passing over a pulley 21 on the shaft 19 and over a pulley 22 on the shaft 17. The eccentric 18 to which the rod 16 is connected is also provided with an arm 23 which in the movement of the eccentric is adapted to actuate a rod 24 for the purposes described below. It is obvious therefore that in the actuation of the conveyer belt 11 the collecting and measuring device 13 also is actuated and admits intermittently a certain amount of mica film into the top end of the tower.

The adhesive in form of dry powdered shellac or flakes of shellac, or such like may either be mixed with the films of mica in each of the buckets 10 or some of the buckets of the carrier 11 may contain mica film exclusively, while other buckets thereon contain the adhesive exclusively, so that the films as well as the flakes or grains of shellac are dispersed and uniformly distributed over the area of the tower by the obstructing means and by the blast directed against the same. The apparatus may also be modified by blowing, not only air but also an adhesive in the form of fine powder or flakes against the mica films which are dropped into the tower, but the means for injecting the adhesive in this way is not illustrated in the drawing. The arm 23 which is connected with the eccentric 18 actuates rod 24 which is connected with an arm 35 of a valve 26. This valve is interposed in a conduit leading from a reservoir 28 into the tower 1. The free end of the conduit 27 extending from the reservoir is provided with a suitable nozzle or mouth piece 29. An air pump connected with the reservoir 28 may be driven by any suitable means, which are not illustrated in the drawing.

The method of manufacturing a mica plate by means of this device, is the following: Mica films either mixed with flaked shellac or powdered shellac or without any admixture of an adhesive are placed into the buckets 10 of the conveyer 11; it may be advisable to weigh the amount of each bucket before placing it on the belt. The belt carries the buckets of mica mixed with shellac, or buckets of mica alternating with buckets of shellac to the pulley 12, at which point the buckets 10 are inverted so as to empty their contents into the measuring device 13. At certain predetermined intervals this measuring and collecting device will discharge the pack of films deposited into the upper end of the tower and here the loose films are met by a blast of air or gas directed against the same and will therefore be dispersed over the entire area of the tower. On account of the obstructions placed in the path of the films this dispersion will be more complete and the films will gradually settle on the base plate which has previously been inserted into the lower end of the tower. The door 31 which serves for insertion or removal of the plate is preferably closed while the apparatus is in operation. After a sufficient amount of films and shellac has been deposited on the support plate 4 said plate with the deposit thereon is withdrawn and is either baked in some suitable manner so as to unite the films by means of the shellac or is subjected to pressure while it is being heated and whereby the same object is attained. It is also obvious that during the settling of the films on the support plate said plate or the lower end of the tower may be heated so as to melt the shellac before the deposit is withdrawn from the tower.

The described method and apparatus embodies a large plurality of important advantages over the methods and devices which are used. The films are deposited automatically while up to the present time most of the boards were stacked up by hand. Another important advantage is, that shellac or other adhesive is used in dry condition while most of the devices used heretofore relied upon some liquid or semi-liquid adhesive; shellac usually was liquefied by the addition of wood alcohol, and as alcohol rapidly evaporates, the cost of this ingredient was a considerable item in the manufacture of mica boards. Alcohol also decreased the insulating power of the finished product, and it was therefore necessary to remove the alcohol by pressing the board after stacking.

I claim:

In an apparatus for making mica board the combination of a tower, means for conveying predetermined amounts of mica flakes to said tower at the top thereof, a retaining device for the flakes mounted on top of the tower and adapted to discharge the material into said tower, said retaining device extending into the tower, means for intermittently actuating said retaining device to release the material, a nozzle within the tower in alinement with the discharge opening of the retaining device and at a distance from said opening, the interspace between said discharge opening and the nozzle being free of obstructions, and a plurality of obstructions below the nozzle arranged in series at different levels, the obstructions of one series extending transversely through the tower in a direction different from the obstructions in the other series.

Signed at Chicago, Illinois, this twenty-fifth day of March, 1912.

WILLIAM H. SILLS.

Witnesses:
L. LANG,
ALICE I. MORAN.